(12) United States Patent
Liu et al.

(10) Patent No.: US 11,295,307 B2
(45) Date of Patent: *Apr. 5, 2022

(54) METHOD AND APPARATUS OF OBTAINING LOCATION INFORMATION

(71) Applicant: ADVANCED NEW TECHNOLOGIES CO., LTD., George Town (KY)

(72) Inventors: Hui Liu, Shanghai (CN); Lin Zhou, Shanghai (CN); Haohua Zheng, Shanghai (CN); Huifeng Jin, Shanghai (CN); Tiancheng Xiang, Shanghai (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/098,823

(22) Filed: Nov. 16, 2020

(65) Prior Publication Data

US 2021/0065177 A1 Mar. 4, 2021

Related U.S. Application Data

(63) Continuation of application No. 14/839,709, filed on Aug. 28, 2015, now Pat. No. 10,853,806.

(30) Foreign Application Priority Data

Aug. 29, 2014 (CN) .......................... 201410437944.5

(51) Int. Cl.
*G06Q 20/40* (2012.01)
*G06Q 20/32* (2012.01)
*H04W 4/021* (2018.01)

(52) U.S. Cl.
CPC .......... *G06Q 20/40* (2013.01); *G06Q 20/3224* (2013.01); *G06Q 20/3274* (2013.01); *H04W 4/021* (2013.01)

(58) Field of Classification Search
CPC ........................................................ G06Q 20/40
(Continued)

(56) References Cited

U.S. PATENT DOCUMENTS 7,113,781 B1 9/2006 Allison et al.
7,917,406 B2 3/2011 Kido et al.
(Continued)

FOREIGN PATENT DOCUMENTS

CN 103700192 A 4/2010
CN 102934132 A 2/2013
(Continued)

OTHER PUBLICATIONS

Roles of proxy in location based services :Published in: The 13th IEEE International Symposium on Personal, Indoor and Mobile Radio Communications (vol. 3, pp. 1252-1256 vol. 3) Authors: A. Escudero-Pascual • G.Q. Maguire, Jr. (Year: 2002).*
(Continued)

*Primary Examiner* — Bruce I Ebersman
*Assistant Examiner* — John A Anderson

(57) ABSTRACT

A method and an apparatus of obtaining location information are disclosed. According to the disclosed method, a server obtains transaction data uploaded by a terminal, determines a transaction device identifier and transaction address information included in the transaction data, and determines and stores location information of a transaction device corresponding to the transaction device identifier based on the transaction address information. Using the above method, the server is able to automatically record the location information of the transaction device through the
(Continued)

transaction data uploaded by the terminal, without the need of manually recording the location information of the transaction device, thereby effectively enhancing the efficiency of obtaining the location information of the transaction device.

15 Claims, 4 Drawing Sheets

(58) Field of Classification Search
USPC .................................................. 705/39, 35
See application file for complete search history.

(56) References Cited

U.S. PATENT DOCUMENTS

| | | |
|---|---|---|
| 8,447,666 B1 | 5/2013 | Keld |
| 8,601,374 B2 | 12/2013 | Parham et al. |
| 8,706,557 B1 | 4/2014 | Tavares |
| 8,990,347 B2 | 3/2015 | Schneider |
| 9,836,743 B2 * | 12/2017 | Celikyilmaz .......... G06Q 20/40 |
| 2004/0128256 A1 | 7/2004 | Krouse et al. |
| 2005/0119017 A1 | 6/2005 | Lovell et al. |
| 2007/0198938 A1 | 8/2007 | Parham et al. |
| 2008/0059607 A1 | 3/2008 | Schneider |
| 2008/0086414 A1 | 4/2008 | Ching |
| 2009/0254476 A1 | 10/2009 | Sharma et al. |
| 2009/0327135 A1 | 12/2009 | Nguyen et al. |
| 2010/0257066 A1 | 10/2010 | Jones et al. |
| 2010/0279656 A1 | 11/2010 | Hazzani |
| 2011/0047075 A1 | 2/2011 | Fourez |
| 2011/0202466 A1 | 8/2011 | Carter |
| 2011/0251892 A1 | 10/2011 | Laracey |
| 2012/0023022 A1 | 1/2012 | Carroll et al. |
| 2012/0191614 A1 | 7/2012 | Babitch et al. |
| 2012/0239564 A1 | 9/2012 | Summerrow et al. |
| 2012/0330764 A1 | 12/2012 | Nahidipour |
| 2013/0150090 A1 | 6/2013 | Cho et al. |
| 2013/0185155 A1 | 7/2013 | Colando |
| 2013/0185166 A1 | 7/2013 | Larkin |
| 2013/0240622 A1 | 9/2013 | Zhou et al. |
| 2014/0006198 A1 | 1/2014 | Daly et al. |
| 2014/0032346 A1 | 1/2014 | Hong et al. |
| 2014/0067440 A1 | 3/2014 | Stewart |
| 2014/0122337 A1 | 5/2014 | Kang |
| 2014/0164119 A1 | 6/2014 | Narayanan et al. |
| 2014/0237374 A1 | 8/2014 | Yokomichi |
| 2014/0358769 A1 | 12/2014 | Howe et al. |
| 2015/0310410 A1 | 10/2015 | Chai et al. |
| 2016/0132857 A1 * | 5/2016 | Unser .................... G06Q 20/12 705/39 |
| 2016/0173469 A1 | 6/2016 | Zhang et al. |
| 2019/0114614 A1 * | 4/2019 | Kumaraguruparan ........................ G06Q 20/3224 |

FOREIGN PATENT DOCUMENTS

| | | |
|---|---|---|
| CN | 103543436 A | 1/2014 |
| CN | 103543463 A | 1/2014 |
| CN | 103843026 A | 6/2014 |
| JP | 2004-240794 A | 8/2004 |
| JP | 2006-129257 A | 5/2006 |
| JP | 2009-289063 A | 12/2009 |
| JP | 2010-250471 A | 11/2010 |
| JP | 2012-073738 A | 4/2012 |
| JP | 2012-141776 A | 7/2012 |
| JP | 2013-254341 A | 12/2013 |
| JP | 2014-010463 A | 1/2014 |
| KR | 20120087750 A | 8/2012 |
| KR | 20120109178 A | 10/2012 |
| KR | 20130082579 A | 7/2013 |
| KR | 10-2013-0108595 A | 10/2013 |
| KR | 20130113292 A | 10/2013 |
| RU | 2011119760 A | 11/2012 |
| TW | 201301183 A | 1/2013 |
| TW | 201419820 A | 5/2014 |
| WO | 2010/043722 A1 | 4/2010 |

OTHER PUBLICATIONS

PCT Search Report and Written Opinion dated Dec. 4, 2015 for PCT Application No. PCT/US15/47554, 8 pages.
Examination Report for Application No. AU 2015308613, dated Oct. 3, 2017, 3 pages.
Korean Office Action issued in Application No. 10-2017-7008396, dated Dec. 15, 2017, 11 pages (English Translation).
First Office Action for Chinese Application No. 201410437944.5, dated Jan. 19, 2018, 5 pages.
Search Report for Chinese Application No. 201410437944.5, dated Jan. 11, 2018, 1 page.
Canadian Office Action for Application No. 2,957,038, dated Sep. 29, 2017, 3 pages.
Examination Report for Australian Application No. 2015308613, dated Jan. 9, 2018, 3 pages.
Search Report for European Application No. 15837027.0, dated Mar. 23, 2018, 7 pages.
Search Report for Russia Application No. 2017107456, dated Apr. 16, 2018, 4 pages.
Office Action for Russia Application No. 2017107456, dated Apr. 16, 2018, 5 pages.
Office Action for Japanese Application No. 2017-511593, dated Apr. 24, 2018, 11 pages.
Office Action for Korean Application No. 10-2017-7008396, dated Jun. 7, 2018, 7 pages.
Notice of Decision for Rejection dated Jul. 19, 2018, issued in related Korean Application No. 10-2017-7008396 (7 pages).
Final Office Action dated Aug. 28, 2018, issued in related Japanese Application No. 2017-511593 (14 pages).
Akihiko Sugimoto et al., "PREDICT2013, Triple Media Fuse", Nikkei Digital Marketing, Nikkei Business Publications, Inc., Dec. 25, 2012, vol. 63, [ISSN] 2185-9965, pp. 4-13.
International Preliminary Report on Patentability dated Mar. 9, 2017, issued in International Application No. PCT/US2015/047554 (7 pages).
First Office Action issued for Korean Patent Application No. 10-2018-7023792, dated Sep. 13, 2018, 14 pages.
Second Office Action issued for Canadian Patent Application No. 2,957,038, dated Oct. 4, 2018, 3 pages.
Second Office Action issued for Korean Patent Application No. 10-2018-7023792 dated May 13, 2019 (16 pages).
Second Office Action issued for Chinese Application No. 201710437944.5 dated Jan. 9, 2019 with English machine translation (10 pages).
Third Office Action issued for Chinese Application No. 201710437944.5 dated Apr. 12, 2019 with English machine translation (12 pages).
Taiwanese Office Action for Taiwanese Application No. 104102870 dated Mar. 29, 2019 (12 pages).
Taiwanese Office Action for Taiwanese Application No. 104102870 dated Sep. 26, 2018.
Examination Report for Indonesian Patent Application No. P00201701185 dated Aug. 6, 2019 (2 pages).
Office Action for Korean Application No. 10-2018-7023792 dated Dec. 11, 2019 (8 pages).
Office Action for Korean Application No. 10-2018-7023792 dated Jan. 23, 2020 (9 pages).
Office Action for Japanese Application No. 2019-036153 dated Dec. 17, 2019 (7 pages).
Exam Report for European Application No. 15837027.0, dated Jun. 25, 2020.
Location Based Authorization using Smart Phones. Author Feng Zhang et al. ISSBN 978 1 4673-2172-3 (Year: 2012).
Taiwanese Office Action and Search Report for Taiwanese Application No. 108146495 dated May 18, 2020.

(56) References Cited

OTHER PUBLICATIONS

Search Report for Taiwanese Application No. 110101910 dated Dec. 16, 2021.

* cited by examiner

METHOD AND APPARATUS OF OBTAINING LOCATION INFORMATION

CROSS REFERENCE TO RELATED PATENT APPLICATION

The present application is a continuation of U.S. patent application Ser. No. 14/839,709 filed on Aug. 28, 2015, entitled "Method and Apparatus of Obtaining Location Information." The U.S. patent application Ser. No. 14/839,709 is based on and claims priority to Chinese Patent Application No. 201410437944.5, filed on Aug. 29, 2014. The entire contents of all of the above-identified applications are incorporated herein by reference.

TECHNICAL FIELD

The present disclosure relates to the field of computer technologies, and in particular, to methods and apparatuses for obtaining location information.

BACKGROUND

With the popularity of transaction devices such as Point of Sales (POS) machines and vending machines, users can conveniently purchase their desired commodities without the need of carrying a large amount of cash.

Recently, geographical location information of a transaction device such as a POS machine or a vending machine needs to be obtained in many application scenarios.

For example, in order to help a user to purchase commodities nearby, a server may obtain geographical location information of each transaction device in the vicinity of the user and provide the information to the user. For another example, when alarm information of a failure returned by a transaction device is received, geographical location information of that transaction device may be obtained, and an operation and maintenance personnel nearby may be timely notified, so that the operation and maintenance personnel may repair the transaction device.

However, a large number of current transaction devices do not have a functionality of reporting respective location information to a server. Therefore, location information of each transaction device has to be recorded manually, and then entered into the server in existing technologies.

Apparently, the existing technologies have a low efficiency in obtaining location information.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide methods and apparatuses of obtaining location information to solve the problem of a low efficiency in obtaining location information in the existing technologies.

In an embodiment of the present disclosure, a method of obtaining location information may include obtaining transaction data uploaded by a terminal; determining a transaction device identifier and transaction address information included in the transaction data; and determining and storing location information of a transaction device corresponding to the transaction device identifier based on the transaction address information.

In an embodiment of the present disclosure, a method of obtaining location information may include receiving each piece of geographical location information reported by a terminal at different reporting time points; obtaining transaction data uploaded by the terminal; determining a transaction device identifier and a transaction time point included in the transaction data; determining a reporting time point having the shortest period of time from the transaction time point based on the different reporting time points and the transaction time point; and determining and storing location information of a transaction device corresponding to the transaction device identifier based on geographical location information reported by the terminal at the determined reporting time point.

In an embodiment of the present disclosure, an apparatus of obtaining location information may include an acquisition module to obtain transaction data uploaded by a terminal; a determination module to determine a transaction device identifier and transaction address information included in the transaction data that is obtained by the acquisition module; and a storage module to determine and store location information of a transaction device corresponding to the transaction device identifier based on the transaction address information that is determined by the determination module.

In an embodiment of the present disclosure, an apparatus of obtaining location information may include a receiving module to receive each piece of geographical location information reported by a terminal at different reporting time points; an acquisition module to obtain transaction data uploaded by the terminal; a first determination module to determine a transaction device identifier and a transaction time point included in the transaction data; a second determination module to determine a reporting time point having the shortest period of time from the transaction time point based on the different reporting time points and the transaction time point; and a storage module to determine and store location information of a transaction device corresponding to the transaction device identifier based on geographical location information reported by the terminal at the determined reporting time point.

According to the methods and apparatuses of obtaining location information provided by the embodiments of the present disclosure, a server obtains transaction data uploaded by a terminal, determines a transaction device identifier and transaction address information included in the transaction data, determines and stores location information of a transaction device corresponding to the transaction device identifier based on the transaction address information. Using the foregoing methods, the server is able to automatically record the location information of the transaction device using the transaction data that is uploaded by the terminal without the need of recording the location information of the transaction device manually, thereby effectively enhancing the efficiency in obtaining the location information of the transaction device.

DESCRIPTION OF THE DRAWINGS

The accompanying drawings described herein are used for providing a deeper understanding of the present disclosure, and constitute a part of the present disclosure. Exemplary embodiments of the present disclosure and a description thereof are used for illustrating the present disclosure and are not to be construed as limitations of the present disclosure. In the drawings.

DETAILED DESCRIPTION

In order to make objectives, technical solutions, and advantages of the present disclosure more comprehensible, the objectives, technical solutions and advantages of the present disclosure are described in a clear and comprehensive manner herein with reference to exemplary embodiments of the present disclosure and accompanying drawings corresponding thereto. Apparently, the described embodiments merely represent a part of but not all of the embodiments of the present disclosure. All other embodiments obtained by one of ordinary skill in the art based on the embodiments of the present disclosure without making any creative effort shall belong to the scope of protection of the present disclosure.

In an embodiment of the present disclosure, an application (i.e., APP) may be installed in a terminal to replace a conventional banking card for electronic payment. When a user makes a payment using the APP installed in the terminal, the APP may upload transaction data which includes an identifier of a transaction device (such as an identifier of a vending machine, an identifier of a POS machine, etc.) and transaction address information to a server at the backend. As such, the server may obtain and store location information of the transaction device based on the transaction data uploaded by the terminal. Examples are given hereinafter for illustration.

Figure 1:
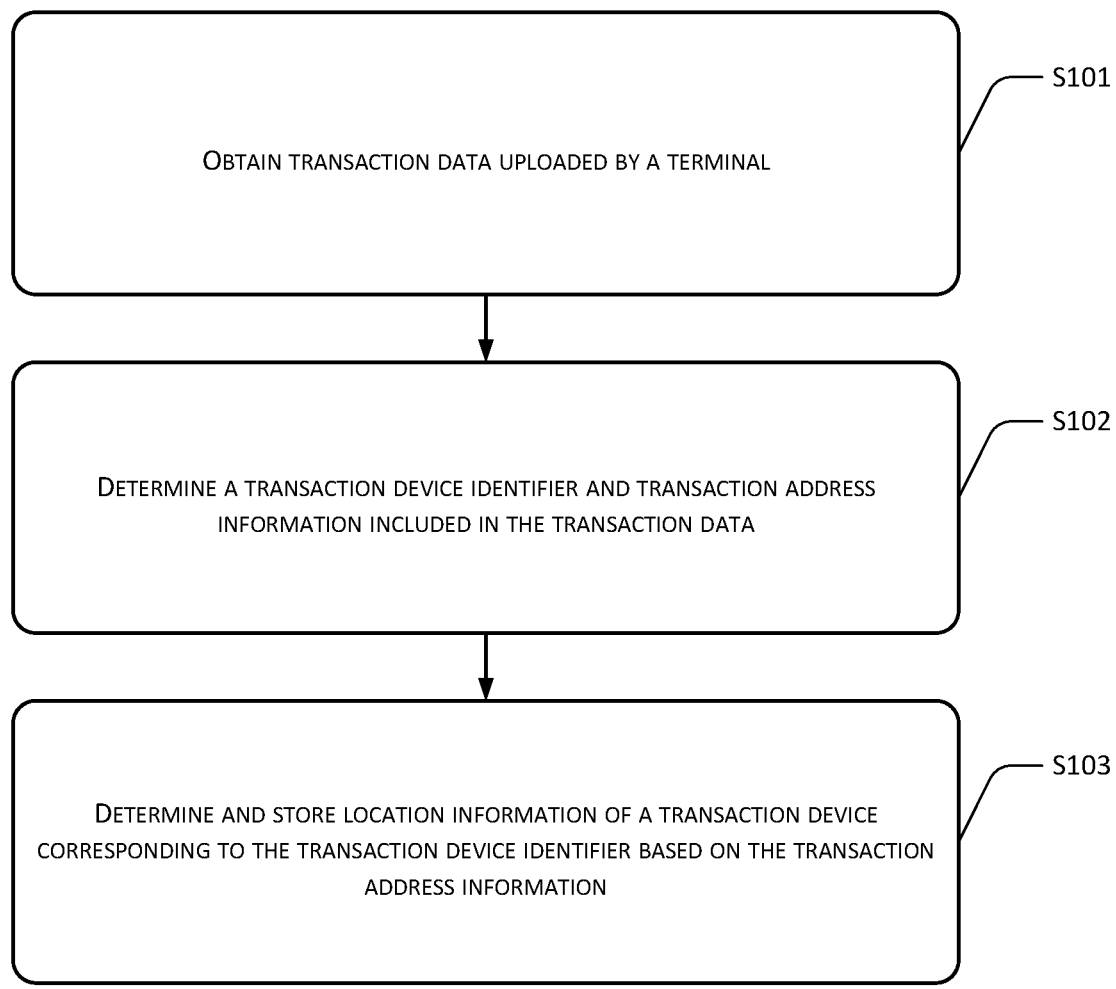
FIG. 1 is a process of obtaining location information according to an embodiment of the present disclosure.

FIG. 1 is a process of obtaining location information according to an embodiment of the present disclosure, which may include the following method blocks.

S101 obtains transaction data uploaded by a terminal.

In an embodiment of the present disclosure, when a user makes an electronic payment via a certain transaction device using an application (APP) installed in a terminal, the APP may upload transaction data associated with this payment to a server. The server may therefore obtain the transaction data uploaded by the terminal.

For example, a certain payment APP is installed in a terminal of a user. The payment APP may generate a unique digital object unique identifier (DOI), such as a barcode or a two-dimensional code, etc., for the user, and the DOI is bound with an account of the user on the APP.

When a user makes a payment on a vending machine or a POS machine, a terminal displaying the DOI may be deployed directly in front of an image capture apparatus of the vending machine or the POS machine, to allow the vending machine or the POS machine to scan the DOI.

After scanning the DOI, the vending machine or the POS machine deducts an amount of consumption from a balance of an account bound with the DOI to complete the payment. After deducting the corresponding amount from the balance of the account bound with the DOI, the vending machine or the POS machine may upload information such as a transaction identifier (such as a transaction swift number) of the current transaction, the deducted amount, an identifier (i.e., a transaction device identifier) of the vending machine or the POS machine, information of a predefined transaction type of the vending machine or the POS machine (e.g., a predefined transaction type for the vending machine is a self-service type, and a predefined transaction type for the POS machine is a supermarket transaction type, etc.), a transaction time, etc., into the server for recording.

After detecting that the corresponding amount has been deducted from the account of the user, the APP may generate transaction data that includes the transaction device identifier and transaction address information of the current transaction, and upload the transaction data to the server.

Specifically, upon detecting that the corresponding amount is deducted from the account of the user, the APP may obtain the transaction device identifier corresponding to the transaction identifier uploaded by the vending machine or the POS machine from the server based on the transaction identifier of the current transaction, determine information of a current location of the terminal via a Global Positioning System (GPS) of the terminal as the transaction address information of the current transaction, and include the obtained transaction device identifier and the determined transaction address information into the transaction data for uploading to the server.

Apparently, the above description is merely given using an example of a vending machine or POS machine performing a deduction by scanning the DOI generated from the APP. In a real application scenario, the vending machine or the POS machine may also make a deduction by interacting with an APP installed in the terminal in other manners, such as an APP supporting acoustic payment, etc.

S102 determines a transaction device identifier and transaction address information included in the transaction data.

S103 determines and stores location information of a transaction device corresponding to the transaction device identifier based on the transaction address information.

Upon receiving the transaction data including the transaction device identifier and the transaction address information uploaded by the terminal, the server determines the transaction device identifier and the transaction address information included in the transaction data at S102. Since the terminal is in the vicinity of the transaction device with certainty when the user uses the terminal to make a payment on the transaction device, the current location information of the terminal may basically be considered to be location information of the transaction device. Therefore, the server may determine and store the location information of the transaction device corresponding to the transaction device identifier based on the transaction address information included in the transaction data at S103. Specifically, the server may directly store the transaction address information included in the transaction data as the location information of the transaction device corresponding to the transaction device identifier.

Continue with the above example, when a user uses an APP on a terminal to make a payment on a vending machine or a POS machine in a real application scenario, the terminal is located in the vicinity of the vending machine or the POS machine with certainty. As such, current location information of the terminal uploaded by the APP at this time may be treated to be location information of the vending machine or the POS machine. Therefore, the server stores the location information included in the transaction data uploaded by the APP as the location information of the vending machine or the POS machine.

Using the above method, the server may obtain location information of a transaction device through transaction data uploaded by a terminal, without the need of recording the location information of the transaction device manually, thereby effectively enhancing the efficiency of obtaining the location information of the transaction device.

Further, after the server determines the transaction device identifier and the transaction location information uploaded by the terminal at S102, the server may determine and store the transaction address information included in the transaction data as the location information of the transaction device corresponding to the transaction device identifier at S103 if the server does not store the location information of the transaction device corresponding to the transaction device identifier at that time. However, if the server has previously stored the location information of the transaction device corresponding to the transaction device identifier, the server may modify the stored location information according to the transaction address information in the transaction data, and store the modified location information at S103 as shown in FIG. 1. For example, the server may determine a connection line between the stored location information of the transaction device and the transaction address information in the transaction data, store a midpoint of the connection line as the modified location information of the transaction device. Based on transaction information reported from multiple terminals and through modification(s) of the location information of the transaction device, the accuracy and the reliability of the location of the transaction device can be ensured.

In order to help users search for a nearby transaction device to purchase commodities desired thereby, after the server stores location information of each transaction device using the above method, the server may further determine transaction device(s) having a distance from a terminal is currently less than a set distance based on current location information of the terminal and the stored location information of each transaction device, and provide respective location information and attribute information of each determined transaction device to the terminal.

The terminal may report location information thereof to the server periodically. The above attribute information of the transaction device may indicate a type of a store in which the transaction device is located, and a transaction type supported by the transaction device, e.g., an attribute of a small commodity self-service, an attribute of a supermarket POS machine, an attribute of a restaurant POS machine, an attribute of a clothing store POS machine, etc. In this way, a user can obtain surrounding stores and available payment modes through location information and attribute information of transaction device(s) provided by the server, thus facilitating user spending.

In an embodiment of the present disclosure, other than providing the location information and the attribute information of the transaction device(s) in the vicinity of the terminal to the terminal based on the stored location information of the transaction device(s), the server may further provide respective location information of transaction devices within a preset geographical location range to the terminal. Specifically, the server may provide location information and attribute information of each transaction device located within a preset geographical location range as well as type information corresponding to the geographical location range to the terminal based on the stored location information of each transaction device and the geographical location range.

For example, a merchant runs a sales promotion in a certain region, and the region where the sales promotion is located may be stored in the server as a preset geographical location range, with type information corresponding to the geographical location range being set as a promotion type. The server may provide respective location information and attribute information of each transaction device within the geographical location range to the terminal, and then provide the type information of "promotion" corresponding to the geographical location range to the terminal based on the stored location information of each transaction device and the preset geographical location range, thus helping a user to obtain available sales promotion by spending via these transaction devices. Apparently, the server may also pre-store detailed information of the sales promotion, and provide the detailed information to the terminal.

For another example, if a certain area has a frequent occurrence of credit card frauds, that area may be stored in the server as a preset geographical location range, and type information corresponding to the geographical location range is set as a dangerous consumption area type. The server may provide respective location information and attribute information of each transaction device in that geographical location range to the terminal, and provide the type information of "dangerous consumption area" corresponding to that geographical location range to the terminal based on the stored location information of each transaction device and the preset geographical location range, so that users may know that an identity theft likely occurs when making a payment on these transaction devices within that geographical location range, thus enhancing security awareness of the users and reducing the possibility of identity thefts or credit card frauds.

As can be seen, the foregoing example method of obtaining location information of the present disclosure is based on a premise that a user uses an APP on a terminal for making a payment, and the APP is able to report a transaction device identifier and current location information of the terminal to a server. If the user does not make a payment through the APP on the terminal, the server is not able to obtain the location information of the transaction device. Thus, in order to enable the server to obtain location information of a transaction device in other scenarios, the embodiments of the present disclosure further provide a method of obtaining location information of a transaction device as shown in FIG. 2 hereinafter.

Figure 2:
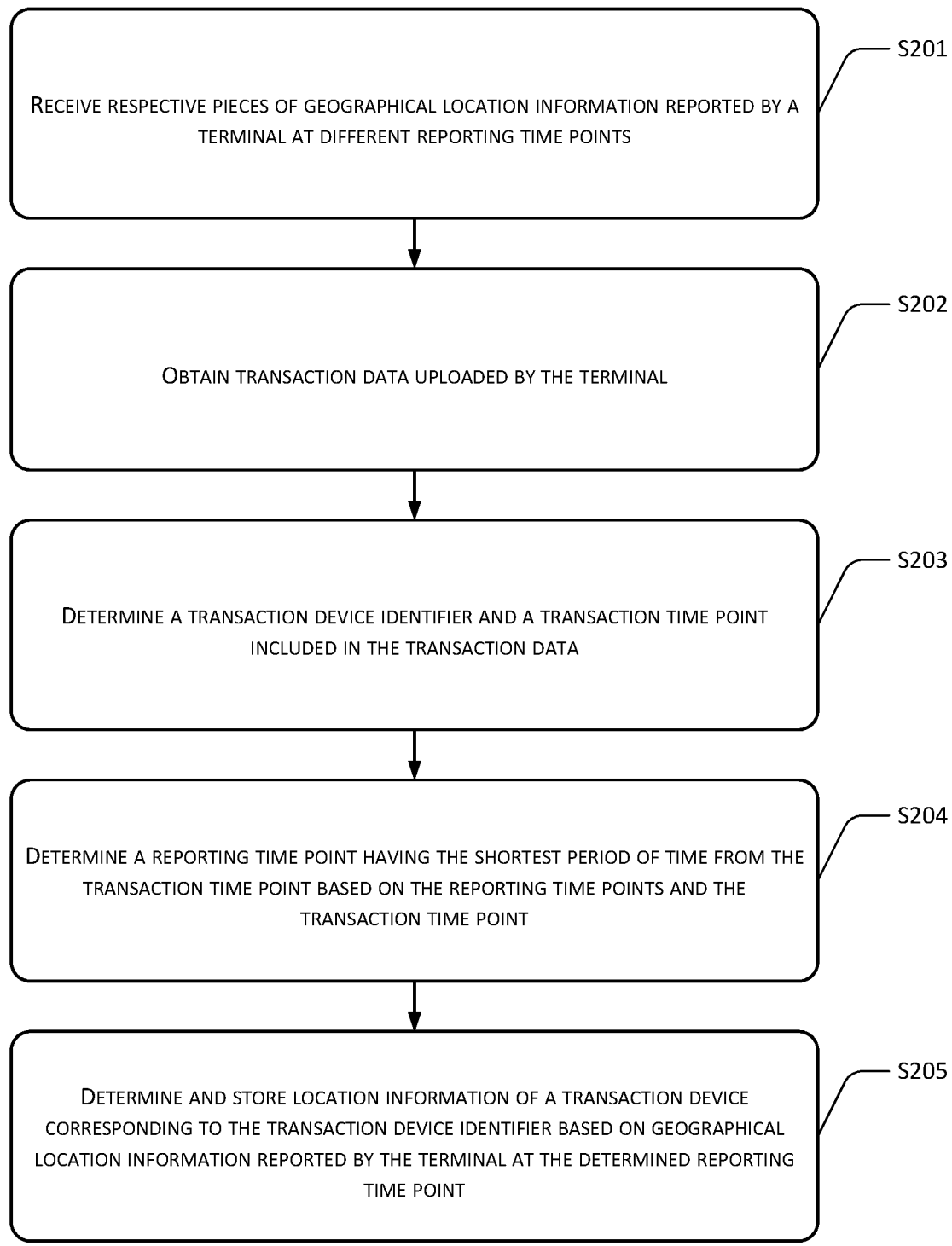
FIG. 2 is another process of obtaining location information according to an embodiment of the present disclosure.

FIG. 2 is another process of obtaining location information according to the embodiments of the present disclosure, which includes the following method blocks.

S201 receives respective pieces of geographical location information reported by a terminal at different reporting time points.

In an embodiment of the present disclosure, the terminal may determine geographical location information thereof via a GPS, and report the information to the server on a regular basis, with each time point of reporting the geographical location information being a reporting time point. The server may receive the geographical location information reported by the terminal at each reporting time point, and store respective pieces of geographical location information and respective reporting time points when the terminal uploads the respective pieces of geographical location information.

S202 obtains transaction data uploaded by the terminal.

S203 determines a transaction device identifier and a transaction time point included in the transaction data.

In an embodiment of the present disclosure, transaction data uploaded by the terminal may include a transaction device identifier and a transaction time point.

Specifically, since an increasing number of users record respective daily spending using an accounting APP installed in respective terminals, and the accounting APP typically records amounts of consumption, times of consumption and identifiers of transaction devices in receipts of the users (such as supermarket receipts, invoices, etc.) by scanning the receipts, the accounting APP may use a time of consumption obtained by scanning as a transaction time point, and generate transaction data including the transaction time point and an associated transaction device identifier for uploading to the server. The server obtains the transaction data uploaded by the terminal at S202, and determines the transaction device identifier and the transaction time point included in the transaction data at S203.

S204 determines a reporting time point having the shortest period of time from the transaction time point based on the reporting time points and the transaction time point.

Since the server has recorded each piece of geographical location information reported by the terminal and respective reporting time points when each piece of geographical location information is reported, the server may determine a reporting time point having the shortest period of time from the transaction time point based on the transaction time point included in the transaction data uploaded by the terminal.

For example, if the terminal reports a piece of geographical location information, P1, at 17:55:00, reports a piece of geographical location information, P2m at 17:55:30, and reports a piece of geographical location information, P3, at 17:56:00, the server records these three reporting time points (17:55:00, 17:55:30, and 17:56:00) and corresponding pieces of geographical location information (P1, P2 and P3). If the transaction time point determined by the server at S203 is 17:55:20, the server may determine a reporting time point having the shortest period of time from the transaction time point is 17:55:30 based on the transaction time point of 17:55:20.

S205 determines and stores location information of a transaction device corresponding to the transaction device identifier based on geographical location information reported by the terminal at the determined reporting time point.

Specifically, the server may directly use and store the geographical location information reported by the terminal at the determined reporting time point as location information of a transaction device corresponding to the transaction device identifier.

Continue with the above example, the geographical location information P2 reported by the terminal at the determined reporting time point 17:55:30 is stored as the location information of the transaction device corresponding to the transaction device identifier included in the transaction data because the server has determined that the reporting time point having the shortest period of time from the transaction time point 17:55:20 is 17:55:30.

This is because when a user makes a payment through a transaction device at a transaction time point, the user needs to be positioned in the vicinity of the transaction device. A location in which the user is positioned at a reporting time point that is closest to the transaction time point is also closest to an actual location of the transaction device. Therefore, the server may store the geographical location information reported by the terminal at the reporting time point hat is closest to the transaction time point as the location information of the transaction device, without the need of manually recording the location information, thus effectively enhancing the efficiency of obtaining the location information.

Apparently, the method as shown in FIG. 2 may also be applicable in a scenario when a user uses an APP to conduct a payment via a transaction device. As long as the server is able to determine a reporting time point that is closest to a time point of the user payment, the server may store geographical location information reported by the terminal at the determined reporting time point as the location information of the transaction device.

As can be seen, the method shown in FIG. 2 is applicable in not only a scenario where a user uses an APP to conduct a payment on a transaction device, but also a scenario where the user uses an accounting APP to scan a receipt to perform an accounting.

Similarly, when the method as shown in FIG. 2 is employed to obtain location information of a transaction device, the server may also determine whether the server has stored the location information of the transaction device therein when determining the location information of the transaction device based on the geographical location information reported by the terminal at the reporting time point that is closest to the transaction time point. If affirmative, the server may modify the stored location information of the transaction device according to the geographical location information reported by the terminal at the reporting time point that is closest to the transaction time point. Otherwise, the server may directly store the geographical location information reported by the terminal at the reporting time point that is closest to the transaction time point as the location information of the transaction device.

Similarly, after obtaining the location information of the transaction device using the method as shown in FIG. 2, the server may also provide respective location information and attribute information of transaction device(s) in the vicinity of the terminal to the terminal, or provide corresponding location information and attribute information of transaction device(s) within a preset geographical location range and type information corresponding to the geographical location range to the terminal. Details thereof are not repeatedly described herein.

A method of obtaining location information according to the embodiments of the present disclosure is described above. Based on the same concept, the embodiments of the present disclosure further provide a corresponding apparatus of obtaining location information, as shown in FIG. 3.

Figure 3:
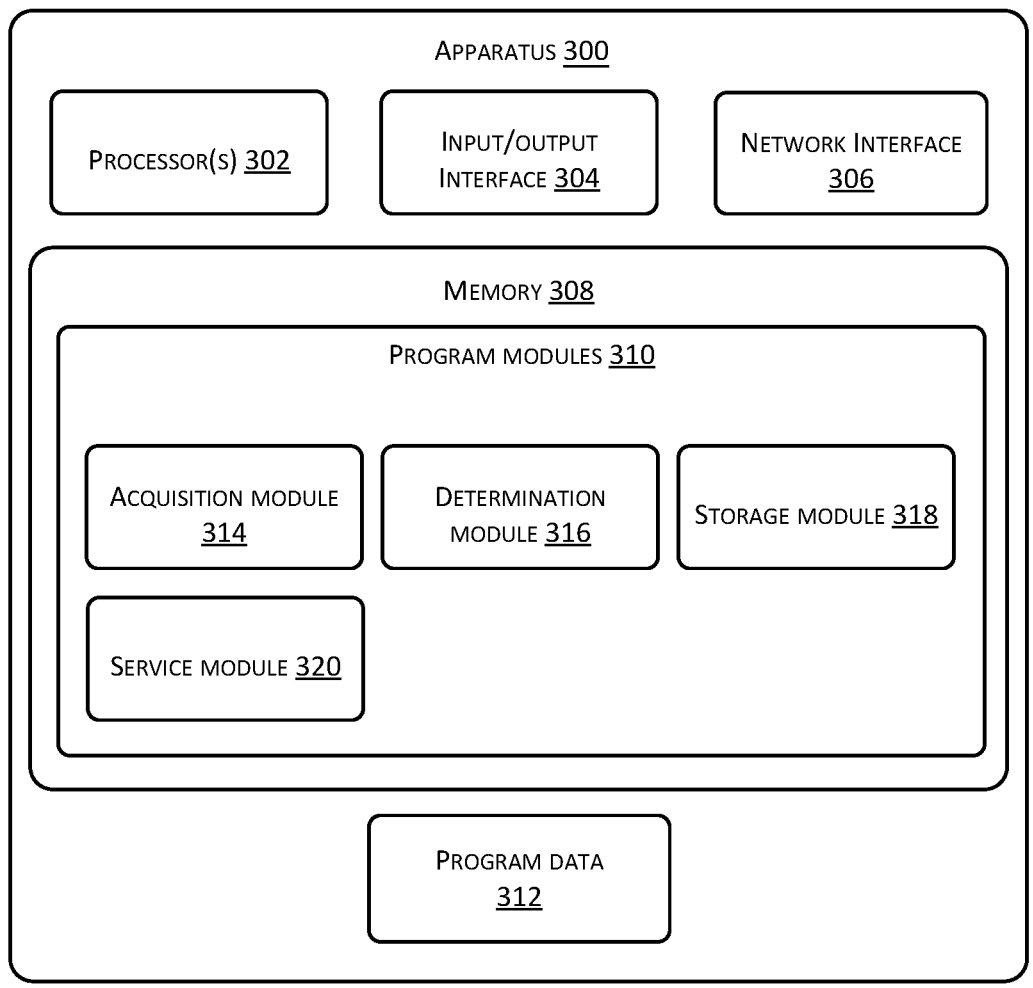
FIG. 3 is a schematic structural diagram of an apparatus of obtaining location information according to an embodiment of the present disclosure.

FIG. 3 is a schematic structural diagram of an apparatus 300 of obtaining location information according to the embodiments of the present disclosure. In an embodiment, the apparatus 300 may include one or more computing devices. In some embodiments, the apparatus 300 may include one or more Central Processing Units (CPUs) or processors 302, I/O interfaces 304, network interfaces 306, and memory 308.

The memory 308 may include a form of computer readable media such as volatile memory, Random Access Memory (RAM), and/or non-volatile memory, e.g., Read-Only Memory (ROM) or flash RAM, etc. The memory 308 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 308 may include program modules 310 and program data 312. The program modules 310 may include an acquisition module 314, a determination module 316 and a storage module 318. The acquisition module is configured to obtain transaction data uploaded by a terminal. The determination module 316 is configured to determine a transaction device identifier and transaction address information included in the transaction data obtained by the acquisition module 314. The storage module 318 is configured to determine and store location information of a transaction device corresponding to the transaction device identifier based on the transaction address information determined by the determination module 316.

The storage module 318 is further configured to determine and store the transaction address information as the location information of the transaction device corresponding to the transaction device identifier if the location information of the transaction device corresponding to the transaction device identifier is not stored, and modify stored location information according to the transaction address information and store the modified location information if the location information of the transaction device corresponding to the transaction device identifier has been stored previously.

The apparatus 300 may further include a service module 320 configured to determine transaction device(s) having a distance from the terminal is/are currently less than a set distance based on current location information of the terminal and stored location information of each transaction device, and provide respective location information and attribute information of each determined transaction device to the terminal.

The apparatus 300 may further include a service module 320 configured to provide respective location information and attribute information of each transaction device located in a preset geographical location range and type information corresponding to the geographical location range to the terminal according to the stored location information of each transaction device and the geographical location range.

In an embodiment, the apparatus 300 as shown in FIG. 3 may be located in a server.

Figure 4:
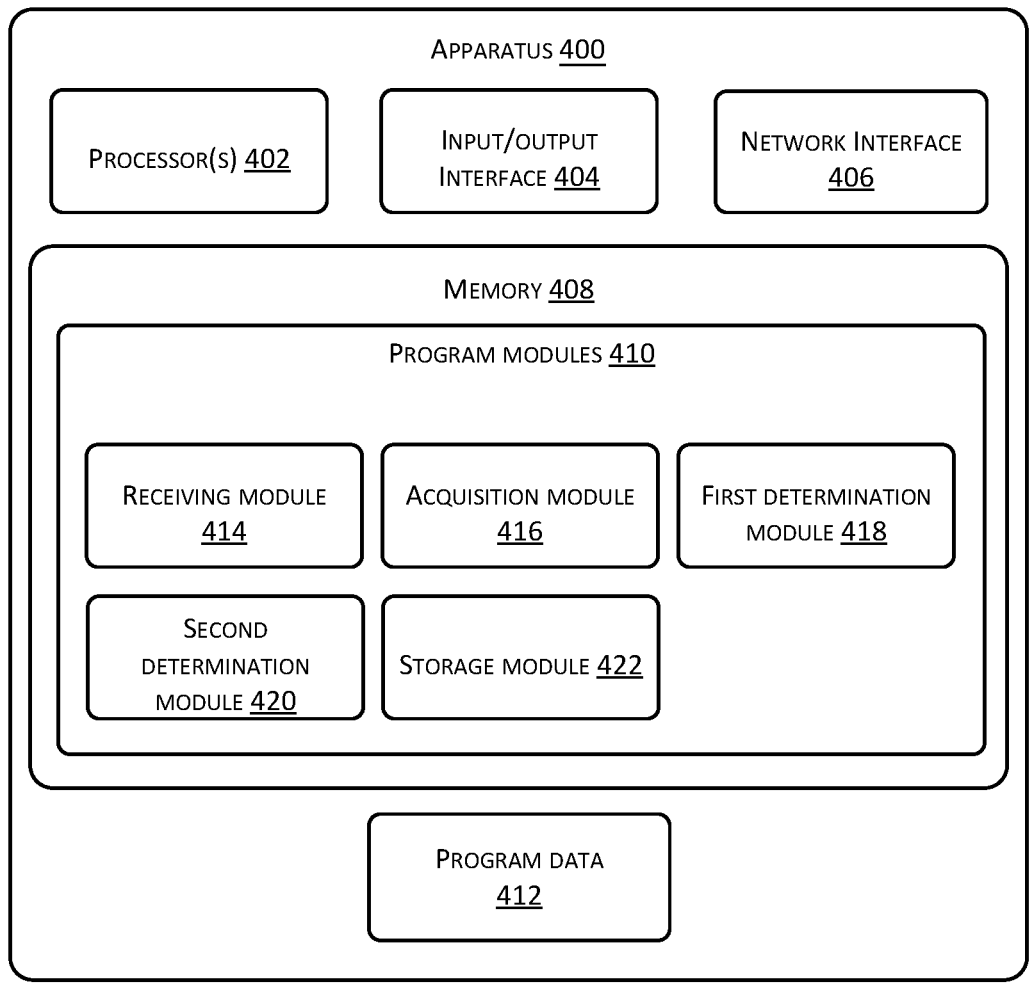
FIG. 4 is a schematic structural diagram of another apparatus of obtaining location information according to an embodiment of the present disclosure.

FIG. 4 is a schematic structural diagram of another apparatus 400 of obtaining location information according to the embodiments of the present disclosure. The apparatus 400 may include one or more processors 402, an input/output interface 404, a network interface 406 and memory 408. The memory 408 may include a form of computer readable media such as volatile memory, Random Access Memory (RAM), and/or non-volatile memory, e.g., Read-Only Memory (ROM) or flash RAM, etc. The memory 408 is an example of a computer readable media as described in the foregoing description.

In an embodiment, the memory 408 may include program modules 410 and program data 412. The program modules 410 may include a receiving module 414 configured to receive respective pieces of geographical location information reported by a terminal at different reporting time points, an acquisition module 416 configured to obtain transaction data uploaded by the terminal, a first determination module 418 configured to determine a transaction device identifier and a transaction time point included in the transaction data, a second determination module 420 configured to determine a reporting time point having the shortest period of time from the transaction time point based on the different reporting time points and the transaction time point, and a storage module 422 configured to determine and store location information of a transaction device corresponding to the transaction device identifier based on a respective piece of geographical location information reported by the terminal at the determined reporting time point.

In an embodiment, the apparatus 400 as shown in FIG. 4 may be located in a server.

According to the methods and apparatuses of obtaining location information provided by the embodiments of the present disclosure, a server may obtain transaction data uploaded by a terminal, and determine a transaction device identifier and transaction address information included in the transaction data, and determine and store location information of a transaction device corresponding to the transaction device identifier based on the transaction address information. Using the foregoing method(s), the server may automatically record the location information of the transaction device through the transaction data uploaded by the terminal, without the need of manually recording the location information of the transaction device, thereby effectively enhancing the efficiency of obtaining the location information of the transaction device.

It should also be noted that terms such as "comprise", "include" or any other variations thereof are meant to cover the non-exclusive inclusions. The process, method, product or apparatus that includes a series of elements not only includes those elements, but also includes other elements that are not explicitly listed, or further includes elements that already existed in such process, method, product or apparatus. In a condition without further limitations, an element defined by the phrase "include a/an . . . " does not exclude any other similar elements from existing in the process, method, product or apparatus.

One skilled in the art should understand that the embodiments of the present disclosure can be provided as a method, a system or a computer program product. Therefore, the present disclosure can be implemented as an embodiment of only hardware, an embodiment of only software or an embodiment of a combination of hardware and software. Moreover, the present disclosure can be implemented as a computer program product that may be stored in one or more computer readable storage media (which includes but is not limited to, a magnetic disk, a CD-ROM or an optical disk, etc.) that store computer-executable instructions.

The above descriptions are merely exemplary embodiments of the present disclosure, and are not intended to limit the present disclosure. For one skilled in the art, the present disclosure may have various modifications and changes. Any modifications, equivalent replacements and improvements, etc., made within the spirit and principle of the present disclosure should be included in the scope of protection of the claims in the present disclosure.

What is claimed is:

1. One or more non-transitory computer-readable mediums coupled to one or more processors and configured with instructions executable by the one or more processors to perform operations comprising:

receiving, at a server, multiple current locations of a first mobile terminal periodically reported by the first mobile terminal at multiple reporting times corresponding to the multiple current locations, the multiple current locations determined by a Global Positioning System (GPS) of the first mobile terminal;

recording, at the server, the multiple current locations of the first mobile terminal and the multiple reporting times corresponding to the multiple locations;

receiving, at the server, transaction data generated and transmitted by the first mobile terminal after conducting a transaction with a first transaction device that is a point of sale (POS) machine or a vending machine, the transaction data comprising a device identifier of the first transaction device obtained by the first mobile terminal when conducting the transaction, and a transaction time of the transaction determined by the first mobile terminal when conducting the transaction, wherein the transaction time occurs after at least one of the multiple reporting times and before at least one of the multiple reporting times;

determining, at the server, the device identifier of the first transaction device and the transaction time of the transaction included in the transaction data received at the server;

determining, at the server, a first reported time of the multiple reporting times that is closest in time to the transaction time determined at the server;

determining, at the server, a first current location of the multiple current locations that corresponds to the first reported time that is determined to be closest in time to the transaction time;

determining, at the server, based on the first location determined to correspond to the first reported time that is determined to be closest in time to the transaction time, a current location of the first transaction device corresponding to the device identifier;

storing, at the server, the determined current location of the first transaction device;

providing, from the server to a second mobile terminal, respective location information of one or more transaction devices that are located in a geographical location range of the second mobile terminal, and attribute information including a type of a store at which the one or more transaction devices are located, wherein the one or more transaction devices include the first transaction device, and the respective location information includes the current location of the first transaction device stored at the server; and providing, from the server to the second mobile terminal, type information identifying the geographical location range as a dangerous consumption area.

2. The one or more non-transitory computer-readable mediums of claim 1, wherein:

the operations further comprise: determining, at the server, that a location of the first transaction device corresponding to the device identifier included in the transaction data is not previously stored; and determining the current location of the first transaction device and storing the current location, comprise: in response to determining that a location of the first transaction device corresponding to the device identifier included in the transaction data is not previously stored, storing, at the server, the first current location determined to correspond to the first reported time that is determined to be closest in time to the transaction time as the current location of the first transaction device corresponding to the device identifier.

3. The one or more non-transitory computer-readable mediums of claim 1, wherein:

the operations further comprise: determining, at the server, that a location of the first transaction device corresponding to the device identifier included in the transaction data is previously stored; and determining the current location of the first transaction device and storing the current location, comprise: in response to determining that a location of the first transaction device corresponding to the device identifier included in the transaction data is previously stored, modifying, at the server, the previously stored location of the first transaction device based at least in part on the first current location determined to correspond to the first reported time that is determined to be closest in time to the transaction time, and storing, at the server, the modified location of the first transaction device corresponding to the device identifier.

4. The one or more non-transitory computer-readable mediums of claim 1, wherein the type information identifying the geographical location as a dangerous consumption area is related to fraudulent payment or identity theft.

5. The one or more non-transitory computer-readable mediums of claim 1, wherein the operations further comprise: determining, at the server, that the one or more transaction devices are currently located at a distance less than a set distance from the second mobile terminal based at least in part on a current location of the second mobile terminal and the respective location information of each of the one or more transaction devices.

6. The one or more non-transitory computer-readable mediums of claim 1, wherein the first transaction device does not have a functionality of reporting its location information to the server.

7. The one or more non-transitory computer-readable mediums of claim 1, wherein the transaction is a payment transaction from the first mobile terminal to the first transaction device, wherein receiving the transaction data generated and transmitted by the first mobile terminal after conducting the transaction with the first transaction device, comprises: receiving the transaction data from an application installed on the first mobile terminal, after the application makes payment on the vending machine or the POS machine.

8. A method, comprising:

receiving, at a server, multiple current locations of a first mobile terminal periodically reported by the first mobile terminal at multiple reporting times corresponding to the multiple current locations, the multiple current locations determined by a Global Positioning System (GPS) of the first mobile terminal;

recording, at the server, the multiple current locations of the first mobile terminal and the multiple reporting times corresponding to the multiple locations;

receiving, at the server, transaction data generated and transmitted by the first mobile terminal after conducting a transaction with a first transaction device that is a point of sale (POS) machine or a vending machine, the transaction data comprising a device identifier of the first transaction device obtained by the first mobile terminal when conducting the transaction, and a transaction time of the transaction determined by the first mobile terminal when conducting the transaction, wherein the transaction time occurs after at least one of the multiple reporting times and before at least one of the multiple reporting times;

determining, at the server, the device identifier of the first transaction device and the transaction time of the transaction included in the transaction data received at the server;

determining, at the server, a first reported time of the multiple reporting times that is closest in time to the transaction time determined at the server;

determining, at the server, a first current location of the multiple current locations that corresponds to the first reported time that is determined to be closest in time to the transaction time;

determining, at the server, based on the first location determined to correspond to the first reported time that is determined to be closest in time to the transaction time, a current location of the first transaction device corresponding to the device identifier;

storing, at the server, the current location of the first transaction device determined by the server;

providing, from the server to a second mobile terminal, respective location information of one or more transaction devices that are located in a geographical location range of the second mobile terminal, and attribute information including a type of a store at which the one or more transaction devices are located, wherein the one or more transaction devices include the first transaction device, and the respective location information includes the current location of the first transaction device stored at the server; and providing, from the server to the second mobile terminal, type information identifying the geographical location range as a dangerous consumption area.

9. The method of claim 8, wherein:

the method further comprises: determining, at the server, that a location of the first transaction device corresponding to the device identifier included in the transaction data is not previously stored at the server; and determining the current location of the first transaction device and storing the current location, comprise: in response to determining that a location of the first transaction device corresponding to the device identifier included in the transaction data is not previously stored, storing, at the server, the first current location determined to correspond to the first reported time that is determined to be closest in time to the transaction time as the current location of the first transaction device corresponding to the device identifier.

10. The method of claim 8, wherein:

the method further comprises: determining, at the server that a location of the first transaction device corresponding to the device identifier included in the transaction data is previously stored; and determining the current location of the first transaction device and storing the current location, comprise: in response to determining that a location of the first transaction device corresponding to the device identifier included in the transaction data is previously stored, modifying the previously stored location of the first transaction device based at least in part on the first current location determined to correspond to the first reported time that is determined to be closest in time to the transaction time, and storing, at the server, the modified location of the first transaction device corresponding to the device identifier.

11. The method of claim 8, wherein the type information identifying the geographical location as a dangerous consumption area is related to fraudulent payment or identity theft.

12. The method of claim 8, wherein the first transaction device does not have a functionality of reporting its location information to the server.

13. The method of claim 8, wherein the transaction is a payment transaction from the first mobile terminal to the first transaction device, wherein receiving the transaction data generated and transmitted by the first mobile terminal after conducting the transaction with the first transaction device, comprises: receiving, at the server, the transaction data from an application installed on the first mobile terminal, after the application makes payment on the vending machine or the POS machine.

14. A method, comprising:

receiving, at a server, transaction data generated and transmitted by a mobile terminal after conducting a transaction with a first transaction device that is a point of sale (POS) machine or a vending machine, the transaction data comprising a device identifier of the first transaction device obtained by the mobile terminal when conducting the transaction, and a current location of the mobile terminal determined by the mobile terminal when conducting the transaction;

determining, at the server, the device identifier of the first transaction device and the current location of the mobile terminal included in the transaction data;

in response to determining at the server that a location of the first transaction device corresponding to the device identifier included in the transaction data is not previously stored on the server, storing, at the server, the current location of the mobile terminal included in the transaction data as the location of the first transaction device corresponding to the device identifier;

providing, from the server to a second mobile terminal, respective location information of one or more transaction devices that are located in a geographical location range of the second mobile terminal, and attribute information including a type of a store at which the one or more transaction devices are located, wherein the one or more transaction devices include the first transaction device, and the respective location information includes the current location of the first transaction device stored at the server; and providing, from the server to the second mobile terminal, type information identifying the geographical location range as a dangerous consumption area.

15. The method of claim 14, wherein the type information identifying the geographical location as a dangerous consumption area is related to fraudulent payment or identity theft.

* * * * *